United States Patent [19]

Collins

[11] Patent Number: 4,627,784

[45] Date of Patent: Dec. 9, 1986

[54] LOADING AND UNLOADING APPARATUS FOR A VEHICLE

[75] Inventor: Larry R. Collins, Cincinnati, Ohio

[73] Assignee: Venco Manufacturing, Inc., Cincinnati, Ohio

[21] Appl. No.: 821,060

[22] Filed: Jan. 21, 1986

[51] Int. Cl.$^4$ .............................................. B60P 1/44
[52] U.S. Cl. ..................................... 414/540; 414/558
[58] Field of Search ............... 414/540, 541, 545, 558, 414/546, 554

[56] References Cited

U.S. PATENT DOCUMENTS

| | | |
|---|---|---|
| 2,706,565 | 4/1955 | Krasno . |
| 3,182,826 | 5/1965 | Mutto ................................ 414/541 |
| 3,263,835 | 8/1966 | Lugash . |
| 3,368,704 | 2/1968 | Pope . |
| 3,710,962 | 1/1973 | Fowler, Jr. . |
| 4,214,849 | 7/1980 | Downing . |
| 4,579,503 | 4/1986 | Disque ............................... 414/558 |

Primary Examiner—Robert J. Spar
Assistant Examiner—Stuart J. Millman
Attorney, Agent, or Firm—Jacox & Meckstroth

[57] ABSTRACT

Parallel spaced posts are rigidly connected by a cross member to form an H-shaped frame, and the frame is supported by carriage members within tracts for linear and tilting movement between a storage position under the floor of a vehicle body and a vertical operating position adjacent a doorway within a side wall of the body. The posts support movable intermediate tracks which support movable elevator members carrying a platform pivotable between an extended horizontal position and a retracted storage position adjacent the posts. Hydraulic cylinders move the frame between its storage and operating positions and also move the elevator members and platform vertically between a bottom position on the ground and an upper position flush with the floor of the body.

22 Claims, 12 Drawing Figures

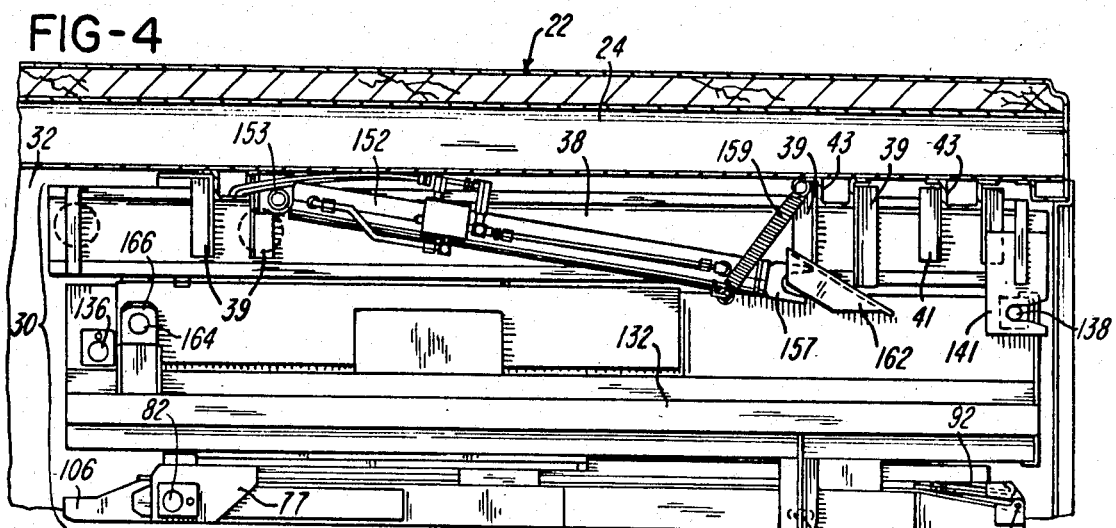
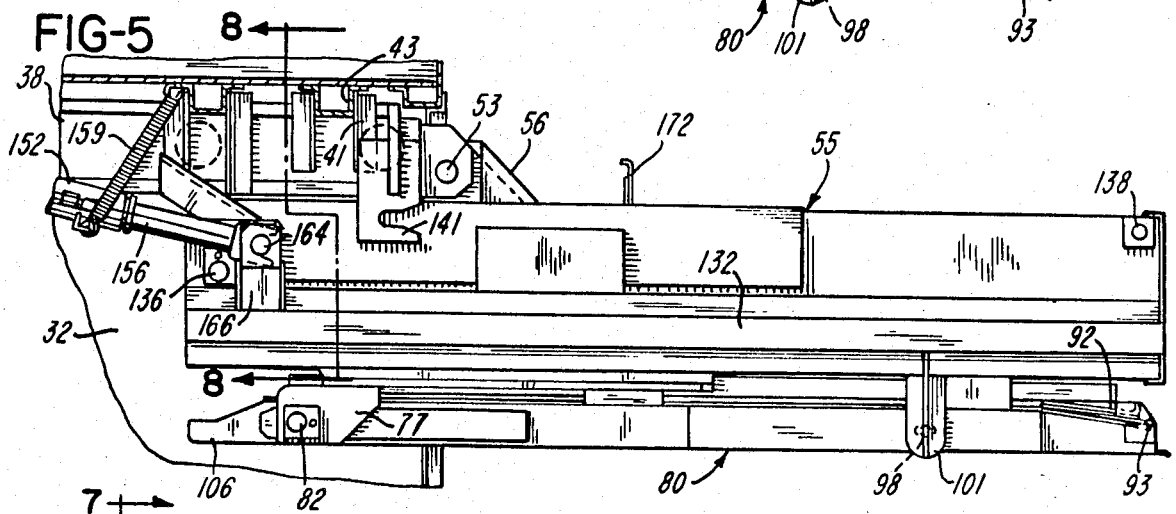
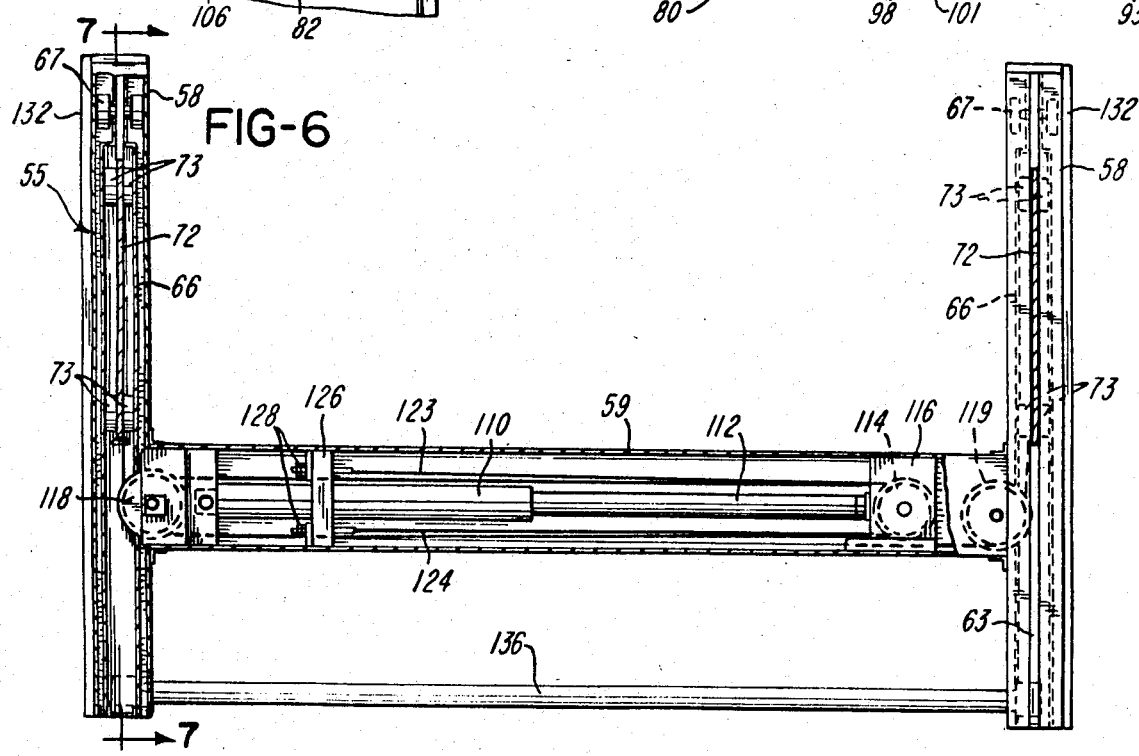

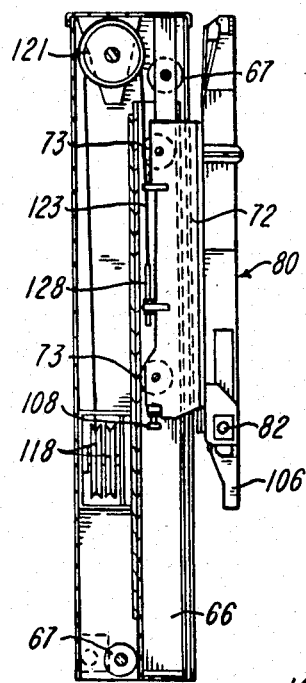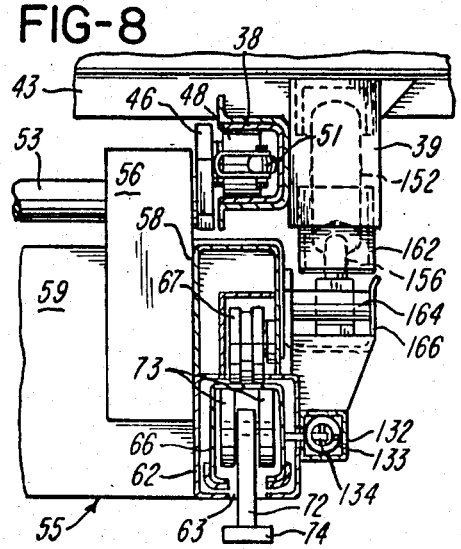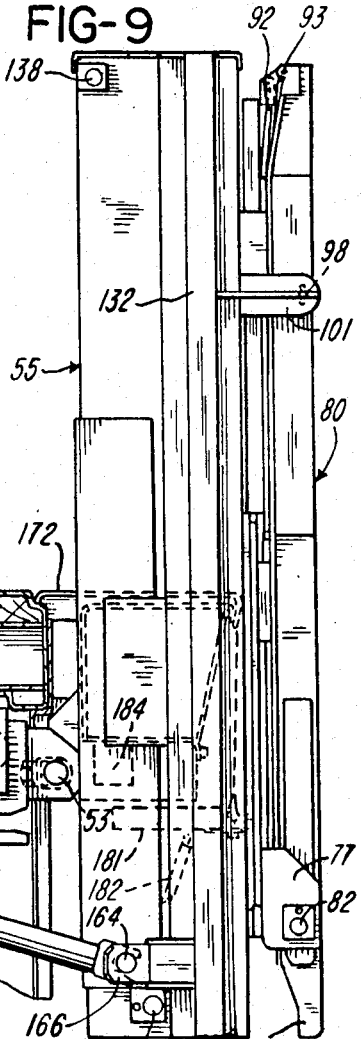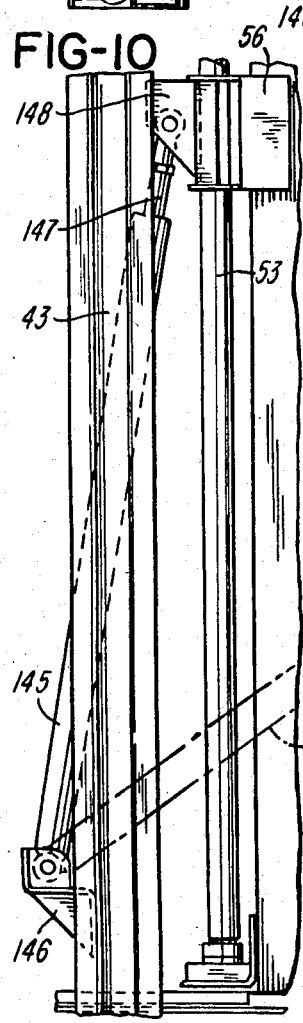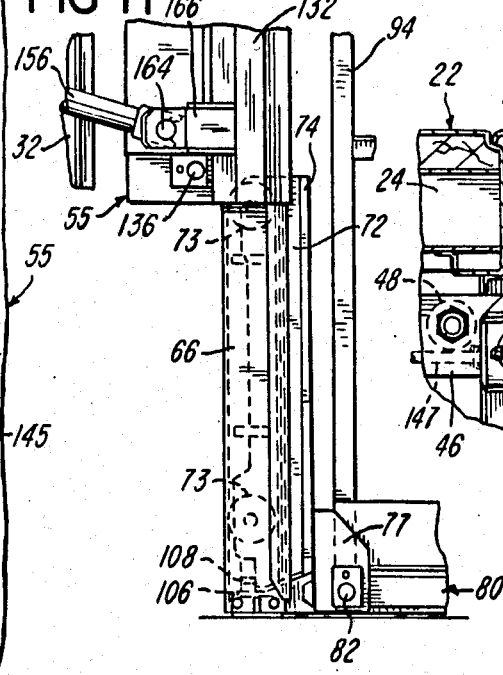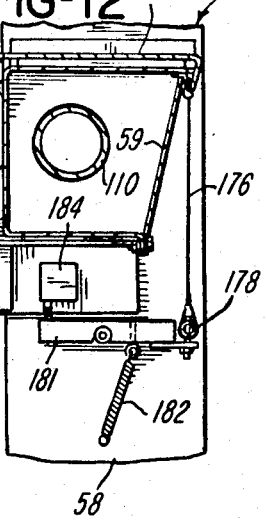

LOADING AND UNLOADING APPARATUS FOR A VEHICLE

BACKGROUND OF THE INVENTION

In the field of power operated loading and unloading equipment or apparatus for use on vehicles such as a truck body or a semi-trailer body, there are many different types of loaders which mount on the rear portion of the vehicle body for use in connection with a doorway opening at the rear of the body. There has also been a number of different types of power operated loaders designed for use in connection with a doorway within a side wall of a truck or trailer body, for example, as disclosed in U.S. Pat. Nos. 3,263,835, 3,368,704, 3,710,962 and 4,214,849.

It is sometimes desirable to provide a full size truck or trailer body with retractable loading apparatus for a doorway within a side wall of the body and for the loading apparatus to be carried by the truck or trailer body without adding to the overall width of the body. For example, many box-like truck and trailer bodies have an overall width of eight feet which is the maximum width permitted by many states. Such bodies are also frequently constructed with U-shaped channel sections which eliminate the need for a main support frame extending under the bed or floor deck of the body. With such frameless bodies, it is important that the unitary construction of the body be maintained and without any modification which reduces the strength of the body. As apparent after reviewing the above-mentioned patents, none of the different loading apparatus disclosed in these patents is adapted for use in connection with a frameless trailer body having a maximum overall width.

SUMMARY OF THE INVENTION

The present invention is directed to improved power operated loading and unloading apparatus adapted for use on a wheel-supported vehicle such as an enclosed truck or trailer body and which is ideally suited to be mounted under a frameless body and used for loading and unloading articles through a side doorway within the body. The apparatus of the invention is also constructed for loading and loading loads of substantial weight and size and for storage in a retracted position under the bed or floor of the body without increasing the overall width of the body. The loading apparatus of the invention further provides for accommodating outwardly pivoting doors mounted on a side wall of the body and for smooth vertical movement of a load support platform between a lower position resting on the ground and an elevated upper position where the platform is flush with the floor surface of the vehicle body.

In accordance with one embodiment of the invention, parallel spaced parallel tracks are attached to the underside of the floor structure of a trailer body and extend laterally of the body. The tracks support corresponding carriage members which pivotally support a rigid H-shaped frame including parallel spaced hollow posts connected by a hollow cross member. Hydraulic cylinders move the frame between a retracted storage position under the trailer floor and a vertical operating position extending adjacent a doorway within a side wall of the trailer body. The parallel spaced posts of the frame support movable intermediate track members in which move elevator members supporting a pivotal platform having pivotal side gates. The cross member of the frame carries a bridge plate which forms an extension of the platform to the trailer floor when the platform is in its upper position. The cross member also encloses a hydraulic cylinder which operates a cable and pulley system connected to the elevator members for moving the platform between its upper and lower positions.

Other features and advantages of the invention will be apparent from the following description, the accompanying drawings and the appended claims.

BRIEF DESCRIPTION OF THE DRAWINGS

FIG. 4 is a side elevational view of the apparatus as shown under the trailer body in its retracted storage position, as taken generally along the line 4—4 of FIG. 1;

FIG. 5 is a side elevational view of the loading platform and its support frame in their laterally extended positions;

FIG. 6 is a side view of the platform support frame with portions broken away to show internal construction;

FIG. 7 is a section of the platform support frame as taken generally on the line 7—7 of FIG. 6;

FIG. 8 is a fragmentary section taken generally on the line 8—8 of FIG. 5;

FIG. 9 is a side elevational view of the apparatus shown in FIGS. 4 and 5 and with the platform and its support frame shown in their vertical positions adjacent to the side wall of the trailer body;

FIG. 10 is a fragmentary plan view of the mechanism for extending and retracting the platform and its support frame;

FIG. 11 is a fragmentary side elevation of the frame in its operating position and the support of the platform in its lowermost horizontal position; and FIG. 12 is a slightly enlarged fragmentary section of the support frame in its operating position as shown in FIG. 9.

DESCRIPTION OF THE PREFERRED EMBODIMENT

Figure 1:
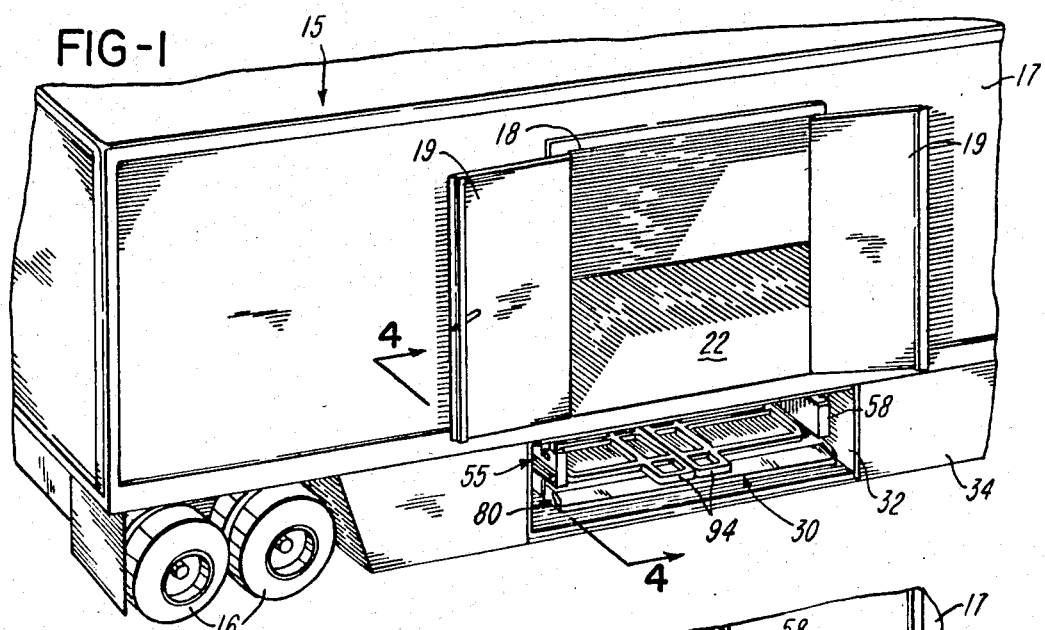
FIG. 1 is a fragmentary perspective view of a wheel supported vehicle or semi-trailer equipped with loading apparatus constructed in accordance with the invention and with the loading apparatus shown in its retracted storage position.

FIG. 1 illustrates a frameless semi-trailer body 15 which is supported by a set of wheels 16 and has a side wall 17 with an opening 18 normally closed by a set of pivotal doors 19. The trailer body 15 has a bed or floor deck 22 which includes laterally extending hat-shaped channel members 24 (FIG. 4). In accordance with the present invention, a loading and unloading system or apparatus 30 is supported in a stored position under the floor deck 22 of the trailer body 15 and is preferably enclosed within a compartment or chamber 32 defined under the floor deck by a suspended fabricated structure 34. The compartment 32 is preferably provided with a side closure or doors (not shown) which extend flush with the side wall 17 of the trailer body when the doors are closed.

Referring to FIG. 4, the loading apparatus 30 includes a pair of parallel spaced U-shaped tracks 38 (FIG. 8) which extend laterally under the floor deck 22 and are supported by a series of brackets 39 and 41 which are welded or secured to hat-shaped channel members 43 extending longitudinally of the trailer body 15 and secured to the cross channel members 24 of the floor structure. A pair of carriage members or plates 46 (FIG. 8) are supported for linear horizontal movement along the tracks 38 by a set of longitudinally spaced rollers 48 and 51 confined within the tracks 38. The outer ends of the carriage plates 46 are rigidly connected by a shaft or cross rod 53 (FIGS. 5 and 8) which pivotally supports an H-shaped frame 55 having brackets 56 for receiving the rod 53.

As shown in FIG. 6, the fabricated metal frame 55 includes parallel spaced hollow posts 58 which are rigidly connected by a hollow cross beam or member 59. Each of the posts 58 includes a tubular track section 62 (FIG. 8) which has a longitudinally extending slot 63. An intermediate tubular track 64 extends within the tubular track section 62 of each post 58 and is supported by a set of upper and lower rollers 67 so that the tracks 66 may move longitudinally from retracted positions (FIG. 7) to downwardly extending positions (FIG. 11) below the posts 58. An elevator member or plate 72 is supported within each of the intermediate tracks 66 by a set of upper and lower rollers 73, and the plate 72 projects outwardly through the corresponding slot 63 to support a flange 74. A bracket 77 (FIGS. 9 & 11) projects from the bottom of each elevator plate 72, and the brackets pivotally support a fabricated metal platform 80 by a pair of pivot pins 82. A pair of spring torsion rods (not shown) extend within the lower portion of the platform 80 and connect the platform to the brackets 77 to provide for counterbalancing the platform 80 when it is moved from its retracted position (FIGS. 2 and 9) to its outwardly projecting horizontal position (FIGS. 3 and 11).

Figure 2:
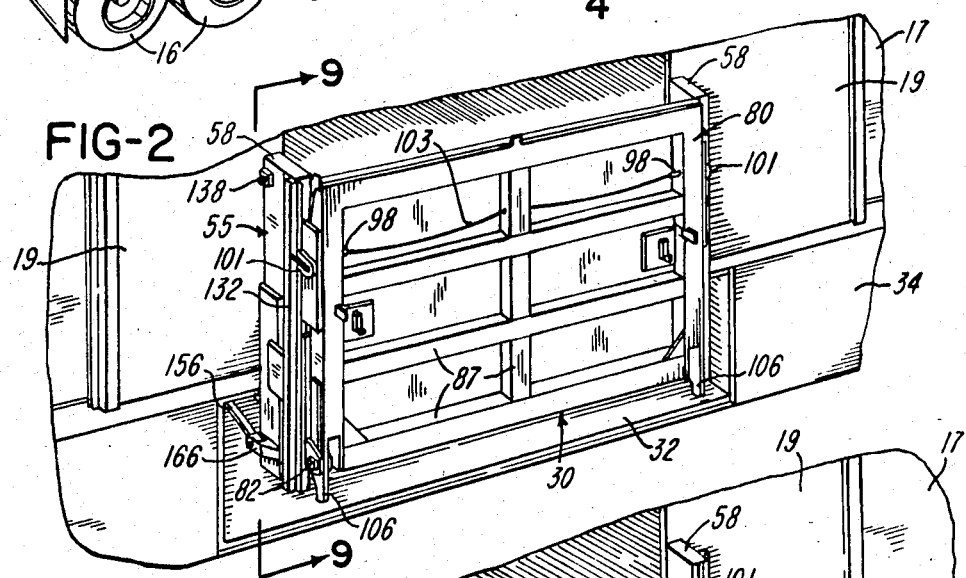
FIG. 2 is a fragmentary perspective view of the trailer body and loading apparatus after the platform and its support frame are extended and tilted to an upright position.
Figure 3:
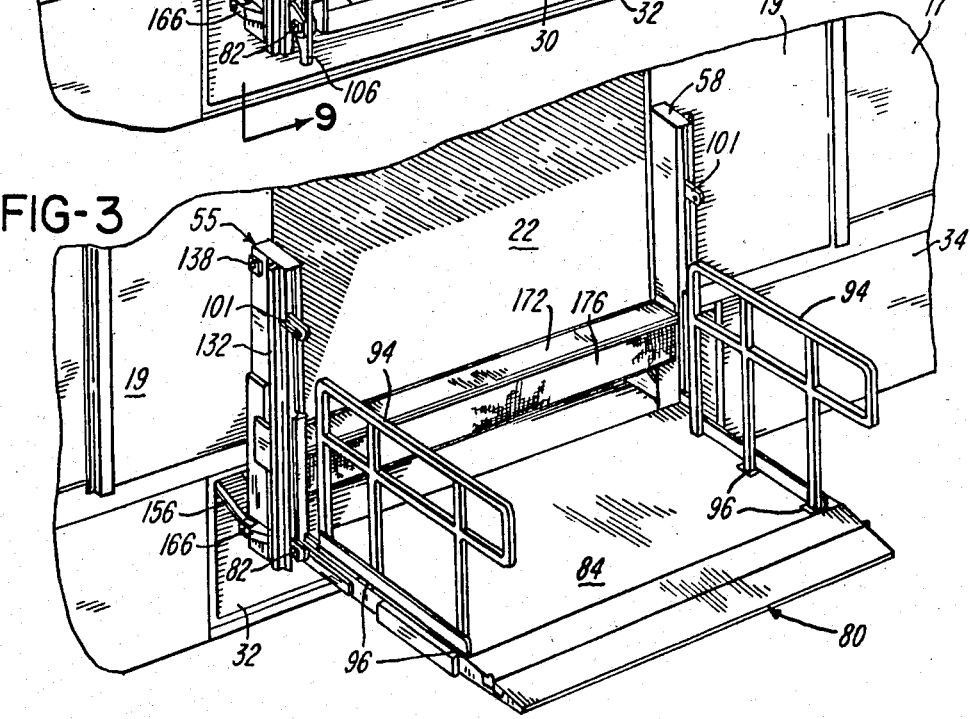
FIG. 3 is a perspective view of the apparatus shown in FIG. 2 and with the loading platform and side gates in their operating positions.

The platform 80 has a relatively flat floor deck 84 which covers a rectangular frame formed by channel-shaped members 87 (FIG. 2). The platform 80 has an outer leading end portion 92 which is wedgeshaped and is pivotally supported by a hinge 93 for movement between an inwardly retracted position (FIG. 9) and an outwardly projecting position (FIG. 3) to form a ramp surface leading to the floor deck 84 of the platform.

A set of side gates 94 are pivotally connected to the platform 80 by corresponding hinges 96 and fold between retracted positions (FIGS. 1 & 9) adjacent the floor deck 84 of the platform 80 and upright positions (FIG. 3) where the side gates are locked. As shown in FIGS. 2 and 9, the platform 80 is retained in its retracted position adjacent the elevator flanges 74 by a set of lock pins 98 which are spring biased outwardly from opposite edges of the platform to engage corresponding slots formed within brackets or ears 101 secured to the posts 58. The pins 98 are connected by a flexible cord 103 (FIG. 3) which extends through the center reinforcing member 87. When the cord 103 is pulled, the lock pins 98 are retracted inwardly from the holes within the brackets 101 so that the platform 80 may be lowered to its horizontal position shown in FIG. 3. The inner or lower end of the platform 80 carries a pair of arms 106 (FIG. 7) which engage adjustable stop screws 108 when the platform 80 is pivoted to its horizontal position.

Referring to FIG. 6, the elevator members or plates 72 are moved vertically within the tracks 66, and the tracks 66 are moved vertically within the track sections 62 by actuation of a hydraulic cylinder 110 which extends longitudinally within the cross member 59 of the frame 55. The cylinder 110 has a piston rod 112 which carries a pair of sheaves or pulleys 114 supported by a block 116 slidably movable within the cross member 59. Another pair of sheaves or pulleys 118 are supported for rotation within the left end of the cross member 59, and a single pulley 119 is supported for rotation within the right end of the cross member 59. Another pulley 121 (FIG. 7) is supported for rotation within the upper end portion of each post 58.

A set of cables 123 and 124 (FIG. 6) have corresponding ends connected to a block 126 within the cross member 59 by adjustable threaded fasteners 128. The cable 123 extends around one of the pulleys 114 and then around the pulley 118. From the pulley 118, the cable 123 extends upwardly within the left post 58 (FIG. 7) around the corresponding pulley 121 and then downwardly to connect with the corresponding elevator member or plate 72 by another adjustable threaded fastener 128. The cable 124 also extends around one of the pulleys 114 and then back around one of the pulleys 118. From the pulley 118, the cable 124 extends around the pulley 119 and upwardly around the pulley 121 within the right post 58. From this pulley 121, the cable 124 extends downwardly to the corresponding elevator member or plate 72 where it connects by another adjustable threaded fastener 128.

A set of tubes 132 (FIG. 8) are mounted on the posts 58, and each tube 132 encloses a tension spring 133. The upper end of each spring is secured to a pin which is anchored to the corresponding post 58, and the lower end of each spring connects with a pin 134 which projects inwardly through a slot within the post 58 and is secured to the corresponding intermediate track 66. The springs 133 normally urge the intermediate tracks 66 upwardly to their retracted positions (FIG. 7) within the corresponding posts 58. In order to lower the platform 80 to its lowermost position resting on the ground surface (FIG. 11), the piston rod 112 is retracted into the cylinder 110 so that the cables 123 and 124 are extended to lower the elevator plates 72. When the elevator plates 72 contact the lower ends of the intermediate tracks 66, the tracks 66 move downwardly with the elevator plates 72 stretching the springs 133 until the platform 80 rests on the ground surface, as shown in FIG. 11. The weight of the platform 80 and the elevator plates 72 causes the piston rod 112 to retract into the cylinder 110 when the cylinder is exhausted under controlled flow for lowering the platform 80. The lower end portions of the posts 58 are rigidly connected by a cross bar 136.

As illustrated in FIG. 4, when the loading apparatus 30 is in its retracted position (also shown in FIG. 1), a set of pins 138 project outwardly from the posts 58 and are received within slots formed within corresponding support plates 141 secured to the tracks 38. Thus the plates 141 carry a portion of the weight of the frame 55 and platform 80 along with the weight of the components within the frame 55.

When it is desired to move the frame 55 and loading platform 80 from their retracted stored position shown in FIG. 4 to their upright operating position shown in FIG. 9, the movement is performed in two steps. The first movement is an extension of the frame 55 and platform 80 from their retracted position laterally outwardly from the compartment 32 to their extended position shown on FIG. 5. This is accomplished by actuation of a fluid or hydraulic cylinder 145 (FIG. 10) which is pivotally connected to a bracket 146 secured to a channel member 43 of the trailer body and having a piston rod 147 connected to a bracket 148 mounted on the pivot rod or shaft 53 connecting the carriage plates 46. When the cylinder 145 is actuated to extend the piston rod 147, the frame 55 and platform 80 are rolled outwardly to the laterally extended position shown in FIG. 5.

The pivoting of the frame 55 and platform 80 from the extended position (FIG. 5) to their vertical operating position (FIG. 9) is obtained by actuation of a pair of hydraulic cylinders 152 which are pivotally connected by pins 153 (FIG. 4) to brackets secured to corresponding cross channel members 24. Each of the hydraulic cylinders 152 has a piston rod 156 which carries a U-shaped member or yoke 157.

When the frame 55 is retracted (FIG. 4), the cylinders 152 are urged or held upwardly by a pair of corresponding tension springs 159. In this position, the retracted yokes 157 are held against corresponding inclined ramp members 162 secured to the adjacent tracks 38 and channel members 43. When the piston rods are extended, the yokes 157 are cammed downwardly along the ramps 162 which guide the yokes 157 into engagement with pivot pins 164 (FIG. 5) secured to the posts 58 by corresponding brackets 166 (FIG. 8). As the piston rods 156 continue to extend, the frame 55 and the platform 80 pivot as a unit about the axis of the cross rod 53 until the frame 55 is in its vertical position, as shown in FIG. 9. After the frame 55 is shifted to this vertical position, the platform 80 is manually pivoted downwardly against the torsion bars to its horizontal position after release of the latch pins 98.

As shown in FIG. 12, the cross member 59 of the frame 55 carries a bridge plate 172 which projects inwardly from the posts 58 and is flush with the floor deck 22 when the frame 55 is in its vertical position. The plate 172 bridges the gap or space 174 between the posts 58 and the side wall 17 of the trailer body 15 to provide clearance for the doors 19. As also shown in FIG. 12, a flexible rubber-like panel 176 extends across the outer surface of the cross member 59 of the frame 55. The lower edge portion of the panel 176 wraps around a cross tube 178 which is supported by a pair of arms 181 pivotally connected by pins 182 to the posts 58. The panel 176 is normally maintained in tension by a set of springs 182 connected to the arms 181, and microswitchs 184 sense any tilting movement of the arms 181. Thus if any object is projecting rearwardly from the platform 80 as the platform is being elevated to its uppermost position flush with the bridge plate 172 and floor deck 22, the object contacts the tube 178 or flexible panel 176. When either one of the switches 184 is actuated, movement of the platform 80 is immediately stopped by closing the valves within the control lines to the cylinder 110.

After using the loading apparatus 30 to load articles or objects onto the floor deck 22 of the trailer body and/or to unload articles or objects from the deck, the apparatus 30 is returned to its stored position (FIG. 4) by reversing the actuation of the hydraulic cylinders 152 and 145 after the platform 80 is repositioned on the frame 55 (FIG. 7) by actuation of the cylinder 110.

From the drawings and the above description, it is apparent that a loading and unloading unit or apparatus constructed in accordance with the invention, provides desirable features and advantages. For example, the apparatus 30 is adapted to mount on the under side of a frameless body without requiring any modification of the structural members of the body. The apparatus also provides for a vertical moving elevating platform adjacent a side doorway within the body and does not add or increase the overall width of the body when the apparatus is stored under the body. As another important feature, the apparatus provides for loading and unloading articles of substantial size and/or weight. Furthermore, when the frame 55 is located in its operating position (FIG. 9), clearance is provided between the frame and the sidewall of the vehicle body for accommodating the doors 19. In addition, the bridge plate 172 provides an extension of the platform deck 84 over the clearance space to provide for rolling carts or other articles with support wheels smoothly between the floor deck 22 and the platform deck 84. The flexible panel 176 and its safety control mechanism provide for immediately stopping movement of the platform in the event an article or object inadvertently projects inwardly from the inner edge of the platform deck 84.

While the form of loading and unloading apparatus herein described constitutes a preferred embodiment of the invention, it is to be understood that the invention is not limited to this precise form of apparatus, and that changes may be made therein without departing from the scope and spirit of the invention as defined in the appended claims. For example, it is within the scope of the invention to provide other mechanical means for extending and tilting the frame 55. That is, the hydraulic cylinders 145 and 152 may be replaced by a single telescopic-type hydraulic cylinder which extends from the floor structure of the trailer body to the center of the frame 55 on the axis of the pins 164. Actuation of the single telescopic cylinder would first shift the frame 55 to its extended position (FIG. 5) and then to its upright or vertical position (FIG. 9).

The invention having thus been described, the following is claimed:

1. Apparatus for loading articles onto the floor of a wheelsupported vehicle, said apparatus comprising a set of rigidly connected and parallel spaced elongated posts, means supporting said posts for longitudinal and tilting movement as a unit between a generally horizontal storage position under the floor of the vehicle and a generally vertical operating position adjacent a wall of the vehicle, an article support platform, elevator means mounted on said posts for longitudinal movement, means mounted on said elevator means and supporting said platform for pivotal movement between a retracted position extending generally parallel to said posts and an extended position projecting outwardly generally perpendicular to said posts, power operated means for moving said elevator means and said platform longitudinally of said posts when said posts are in said vertical operating position and said platform is in said extended position to move said platform between a lower position and an elevated position, power operated means for moving said posts between said operating position and said storage position, and means for retaining said platform in said retracted position when said posts are in said storage position.

2. Apparatus as defined in claim 1 wherein said means supporting said posts for movement as a unit comprise a set of parallel spaced elongated tracks extending generally horizontally under the floor of the vehicle, means for securing said tracks to the vehicle, carriage means supported by said tracks for longitudinal horizontal movement, and means connected to said carriage means and supporting said posts for pivotal movement as a unit on a generally horizontal axis.

3. Apparatus as defined in claim 1 wherein said means for moving said posts comprise fluid cylinder means supported under the floor of the vehicle.

4. Apparatus as defined in claim 3 wherein said means supporting said posts comprise a pair of parallel spaced elongated tracks extending horizontally under the floor of the vehicle, carriage means supported by said tracks for horizontal movement, and means secured to said carriage means and supporting said posts for pivotal movement.

5. Apparatus as defined in claim 4 wherein said fluid cylinder means comprise parallel spaced hydraulic cylinders extending generally adjacent said tracks.

6. Apparatus as defined in claim 1 and including control means supported by said posts and disposed adjacent the vertical path of said platform, and said control means are responsive to an article projecting laterally from said platform for deactivating said power operated means.

7. Apparatus as defined in claim 1 wherein said posts are connected by a cross member to form a rigid frame, and said frame extends horizontally under the floor in said storage position and vertically adjacent the wall of the vehicle in said operating position.

8. Apparatus as defined in claim 7 wherein said means supporting said posts comprise a pair of parallel spaced horizontal tracks disposed under the floor of the vehicle, carriage means supported by said tracks for horizontal movement, and pivot means connecting said frame to said carriage means and supporting said frame for pivotal movement between said operating and storage positions.

9. Apparatus as defined in claim 7 and including a bridge member supported by said cross member to facilitate movement of articles between the floor of the vehicle and said platform in said elevated position.

10. Apparatus as defined in claim 9 wherein said posts are spaced horizontally from the wall of the vehicle when said posts are in said operating position to define a clearance space for doors on the vehicle, and said bridge member projects inwardly from said posts to provide an extension of said platform through the space.

11. Apparatus as defined in claim 7 wherein said means for moving said elevator means comprise a fluid cylinder extending horizontally within said cross member of said frame, and a set of flexible tension elements and guide rollers disposed within said posts and said cross member and connecting said fluid cylinder to said elevator means.

12. Apparatus as defined in claim 1 wherein said platform supports a set of parallel spaced side gates, and means pivotally connecting said side gates to said platform.

13. Apparatus as defined in claim 1 wherein said elevator means comprise a set of elongated intermediate tracks supported by corresponding said posts for longitudinal movement between retracted positions within said posts and extended positions projecting downwardly from said posts, a set of elevator members supported by said intermediate tracks for longitudinal movement, and pivot means connecting said platform to said elevator members.

14. Apparatus as defined in claim 13 and including a set of tension springs connecting said intermediate tracks to said posts for normally urging said intermediate tracks to said retracted positions within said posts.

15. Apparatus as defined in claim 1 wherein said posts are rigidly connected by a cross member, and safety control means extending adjacent said cross member and connected to deactuate said power operated means for moving said elevator means in response to an article inadvertently projecting laterally from said platform.

16. Apparatus as defined in claim 15 wherein said safety control means comprise a panel of flexible material disposed between said cross member and the vertical path of said platform.

17. Apparatus adapted for loading articles onto the floor of a wheel-supported vehicle body having a side wall with a doorway, said apparatus comprising a set of parallel spaced tracks extending horizontally under the floor of the vehicle perpendicular to the direction of travel of the vehicle, a frame including a set of parallel spaced elongated posts rigidly connected by a cross member, carriage means mounted on said tracks and supporting said frame for linear and tilting movement between a generally horizontal storage position under the floor of the vehicle and a generally vertical operating position adjacent the doorway within the side wall of the vehicle body, an article support platform, elevator means mounted on said posts for longitudinal movement, means connected to said elevator means and supporting said platform for pivotal movement between a retracted position extending generally parallel to said frame and an extended position projecting outwardly generally perpendicular to said frame, first actuator means for moving said elevator means and said platform longitudinally of said posts when said frame is in said vertical operating position and said platform is in said extended position to move said platform between a lower position and an elevated position flush with the floor within the doorway, and second actuator means for moving said frame between said operating position and said storage position when said platform in said retracted position.

18. Apparatus as defined in claim 17 and including control means supported by said frame and disposed adjacent the vertical path of said platform, and said control means are responsive to movement of an article projecting laterally from said platform for deactivating said first actuator means.

19. Apparatus as defined in claim 17 wherein said posts are spaced horizontally from the side wall of the vehicle when said frame is in said operating position to define a clearance space for doors on the vehicle, and a bridge member supported by said cross member of said frame and projecting inwardly from said posts to provide an extension of said platform across the space.

20. Apparatus as defined in claim 17 wherein said first actuator means comprise a fluid cylinder extending horizontally within said cross member of said frame, and a set of flexible tension elements and guide rollers disposed within said posts and said cross member and connecting said fluid cylinder to said elevator means.

21. Apparatus as defined in claim 17 wherein said elevator means comprise a set of elongated intermediate tracks supported by corresponding said posts for longitudinal movement between retracted positions within said posts and extended positions projecting downwardly from said posts, a set of elevator members supported by said intermediate tracks for longitudinal movement, and said platform is pivotally connected to said elevator members.

22. Apparatus as defined in claim 21 and including a set of tension springs connecting said intermediate tracks to said posts for normally urging said intermediate tracks to said retracted positions within said posts.

* * * * *